(12) United States Patent
Leuenberger et al.

(10) Patent No.: US 6,584,782 B2
(45) Date of Patent: Jul. 1, 2003

(54) METHOD FOR PRODUCING PARTICULATE GOODS

(75) Inventors: Hans Leuenberger, Pfeffingen (CH); Armin Karl Theodor Prasch, Freiburg (DE); Bernhard Luy, Freiburg (DE)

(73) Assignee: Glatt GmbH, Binzen (DE)

( * ) Notice: Subject to any disclaimer, the term of this patent is extended or adjusted under 35 U.S.C. 154(b) by 0 days.

(21) Appl. No.: 10/182,715

(22) PCT Filed: Feb. 23, 2001

(86) PCT No.: PCT/IB01/00255
§ 371 (c)(1),
(2), (4) Date: Aug. 8, 2002

(87) PCT Pub. No.: WO01/63191
PCT Pub. Date: Aug. 30, 2001

(65) Prior Publication Data
US 2003/0000228 A1 Jan. 2, 2003

(30) Foreign Application Priority Data
Feb. 25, 2000 (CH) ................................................ 0371/00

(51) Int. Cl.⁷ .............................................. F25D 17/02
(52) U.S. Cl. ......................................................... 62/64
(58) Field of Search ................................ 62/57, 62, 64, 62/67, 69

(56) References Cited

U.S. PATENT DOCUMENTS

| | | |
|---|---|---|
| 3,300,868 A | 1/1967 | Anderwert |
| 3,313,032 A | 4/1967 | Malecki |
| 4,608,764 A | 9/1986 | Leuenberger |
| 5,766,281 A | 6/1998 | Luy et al. |
| 5,868,807 A | 2/1999 | Luy et al. |

FOREIGN PATENT DOCUMENTS

| | | |
|---|---|---|
| CH | 384471 | 3/1964 |
| CH | 408781 | 1/1967 |
| CH | 646729 | 12/1984 |
| CH | 664005 | 9/1986 |
| CH | 681564 | 4/1993 |
| CH | 686343 | 3/1996 |
| DE | 1230133 | 4/1971 |
| DE | 2116872 | 10/1983 |
| DE | 3916479 | 8/1990 |
| EP | 0749769 | 12/1996 |
| EP | 0781587 | 6/1998 |
| EP | 0781585 | 2/1999 |
| GB | 952920 | 3/1964 |

*Primary Examiner*—Denise L. Esquivel
*Assistant Examiner*—Malik N. Drake
(74) *Attorney, Agent, or Firm*—Jacobson Holman PLLC

(57) ABSTRACT

In the method for producing a particulate material (58) from an at least partially liquid material (35) containing a solvent and/or dispersant, this material (35) is atomized in a process chamber (21) into droplets which are frozen to particles (131) by contact with a freezing fluid. The particles (131) are then dried by freeze-drying in the or in another process chamber (22) having a filter (18) at the top. For the freeze-drying, cooled process gas is passed upward from below through the process chamber (22) and through the filter (18) in such a way that at least a substantial part of the particles (131) rest against the filter (18) at least for a substantial part of the freeze-drying taking place in the process chamber (22). This makes it possible to dry a batch of particles (131) in a short time.

18 Claims, 2 Drawing Sheets

METHOD FOR PRODUCING PARTICULATE GOODS

This is a nationalization of PCT/IB01/00255 filed Feb. 23, 2001 and published in German.

FIELD OF THE INVENTION

The invention relates to a method for producing a particulate material from an at least partially liquid material containing a solvent and/or dispersant. The at least partially liquid material comprises, for example, a solution and/or a dispersion containing a liquid dispersant, i.e. a suspension and/or emulsion. The solvent and/or liquid dispersant preferably substantially comprises water but may also contain an organic component or at least partly comprise an organic solvent, for example tertiary butanol.

The method is intended in particular for the batchwise production of a particulate material from an at least partially liquid starting material which preferably contains at least one heat-sensitive component.

It is pointed out here that the freezing point of a solution usually depends on the concentration of the components of the solution and may be represented by a melting point diagram. On slowly cooling a solution—depending on the initial composition—frequently only one of the components is initially frozen and solidified, so that separation can take place. Aqueous solutions of active substances and excipients for drugs frequently have a eutectic temperature. On cooling a solution to or below the eutectic temperature, the solvent and a dissolved substance or possibly a plurality of dissolved substances are then simultaneously frozen and solidified, so that a eutectic mixture forms.

PRIOR ART

CH 664 005 A and the corresponding U.S. Pat. No. 4,608,764 A disclose various methods for the batchwise production of particulate materials. Inter alia, it was intended to freeze a solution and/or suspension in a container to give a block and to comminute this mechanically. The resulting particles were then fluidized, in the same container in which the freezing process was carried out, with, for example, process gas consisting of air and were at least for the most part dried by freeze-drying.

This method has various disadvantages. First, there is a considerable risk of separation during the freezing of a block. Furthermore, the mechanical comminution of a block formed by freezing a solution and/or suspension is complicated and expensive and easily leads to contamination of the material. Furthermore, experiments have shown that the freeze-drying by fluidization requires a fairly long time.

A further disadvantage of the known method is associated with the fact that, in the development of a novel product, usually only relatively small amounts are initially produced for test purposes and later on larger amounts of the product are produced as required, for the commercial utilization of the product. For the development and for the commercial production of a product, apparatuses of different sizes are therefore generally required, giving rise to high procurement costs. If a material is produced first in a small apparatus and then in a larger apparatus, new, optimal parameters of the method additionally have to be determined by experiments for this change of apparatus, which is often referred to as "scale up". These additional experiments are time-consuming and increase the production costs.

U.S. Pat. No. 3,313,032 A discloses methods and apparatuses for the freeze-drying of originally liquid materials. In these processes, liquid material is sprayed in a container and the droplets formed are frozen to give particles. These are then dried by freeze-drying in a drying chamber which is formed by a region of the same container or arranged in another container. For fluidization and freeze-drying of the particles, process gas is passed upward from below through a region of the container. The process gas is sucked through a perforated base into the drying chamber and sucked out of the container through a filter arranged on one side of the container casing.

Experiments with other fluidized-bed driers, however, have shown that freeze-drying in a fluidized bed requires a great deal of time. In the case of the apparatus disclosed in U.S. Pat. No. 3,313,032, the containers which serve for freeze-drying are moreover evidently cylindrical from the perforated base to the filter, and the filter is only small in comparison with the cross-sectional area of the drying chamber. The freeze-drying can therefore be carried out only at low process gas flow rates, with the result that the drying time is additionally increased.

SUMMARY OF THE INVENTION

It is the object of the invention to avoid disadvantages of the known methods and apparatuses. It is intended to provide a method which makes it possible to form solid particles, rapidly, simply and as far as possible without separation, from an at least partially liquid material formed, for example, by a solution and/or suspension and/or emulsion, and then to dry said solid particles rapidly and economically at least to a great extent by freeze-drying, i.e. sublimation. Furthermore, it should preferably be possible to use one and the same apparatus alternatively for the production of small and relatively large amounts of a particulate material.

This object is achieved, according to the invention, by a method for the production of a particulate material from an at least partially liquid material containing a solvent and/or dispersant, the method being characterized in that the at least partially liquid material is atomized into droplets and these are frozen to particles by contact with a freezing fluid, that the particles are then dried by freeze-drying in a process chamber having a filter at the top, and that, during the freeze-drying, process gas is passed upward from below through the process chamber and through the filter in such a way that at least a substantial part of the particles rest against the filter during a substantial part of the freeze-drying taking place in the process chamber.

Advantageous further developments of the method are evident from the dependent claims.

According to the invention, at least a substantial part, namely preferably at least the greatest part, of the particles is thus caused, at least during a substantial part of the freeze-drying in a process chamber, to rest against a filter which is arranged at the top in the process chamber and in fact at least partly bounds said chamber at the upper end. The method makes it possible to pass the process gas at a relatively high flow rate and a correspondingly high velocity through the process chamber serving for freeze-drying. Because the particles rest against the filter, a water vapor envelope formed during drying of the particles and enclosing the latter and otherwise inhibiting heat transfer and material transport can furthermore probably be broken up by contact with the filter. The heat transfer to the particles and the release of water vapor are therefore better than in the case of particles suspended in the process gas. Furthermore, the or each gas-permeable filter element of the filter produces a pressure gradient, which in turn produces a high gradient of the water vapor pressure, which promotes the freeze-drying process. For all these reasons, the method according to the invention permits a substantial reduction in the time required for freeze-drying of a given amount of particles.

As already mentioned, the at least partially liquid starting material and the finished, particulate material may contain, for example, at least one heat-sensitive component. The at least partially liquid starting material and the finished, particulate material contain, for example, at least one therapeutic active drug substance and/or drug excipient for the formation of a drug for the treatment of humans and/or animals and/or at least one substance for diagnostic purposes. The active substance and/or excipient and/or the substance for diagnostic purposes are, for example, hydrophilic and water-soluble but may also form a dispersion, such as a suspension or emulsion, together with a liquid dispersant.

The at least partially liquid starting material and the finished material may contain, for example, as dissolved or dispersed component(s), at least one protein and/or peptide, such as an amino acid sequence, immunoglobulins, blood plasma proteins (e.g. a coagulation factor), amorphous and/or crystalline insulin, hirudin, erythropoietins, filgrastim, lenograstim, immunomodulators (e.g. alpha-, beta- and/or gamma-interferon and/or interleukin), peptide hormones, for example leuproline, leuprolide acetate, buserelin acetate, goserelin acetate, triptorelin, or immunosuppresives, such as, for example, cyclosporins. Further possible components are nucleases, enzymes, cytostatic agents, vitamins, vaccines, monoclonal and other antibodies, corticosteroids (e.g. triamcinolone diacetate), steroid hormones (e.g. testosterones), tumor suppression genes, antibiotics (for example penicillin G, erythromycin derivatives), neuroleptic drugs (for example clozapine, fluoxetine), anesthetics (e.g. methadone, morphine), Cox-2 inhibitors, cardiovascular drugs, liposomal formulations, microorganisms and/or cells (e.g. human or animal skin cells or stem cells). If the starting material contains microorganisms or (other) cells for the treatment of humans and/or animals, these can be dispersed, for example, in a dispersant consisting of a nutrient.

The solution or the other at least partially liquid starting material and the finished, particulate material can furthermore contain at least one hydrophilic drug excipient, for example mannitol or cyclodextrin or a polymer, such as polyvinylpyrrolidone, in addition to an active substance or possibly instead of an active substance.

The starting material and the finished, particulate material can also be provided for the formation of a rapidly soluble nutrient or at least nutrient additive or for any other use instead of being provided for human medicine or veterinary medicine.

BRIEF DESCRIPTION OF THE DRAWINGS

The subject of the invention is described in more detail below with reference to an embodiment shown in the drawing. In the drawing.

DESCRIPTION OF THE PREFERRED EMBODIMENTS

Figure 1:
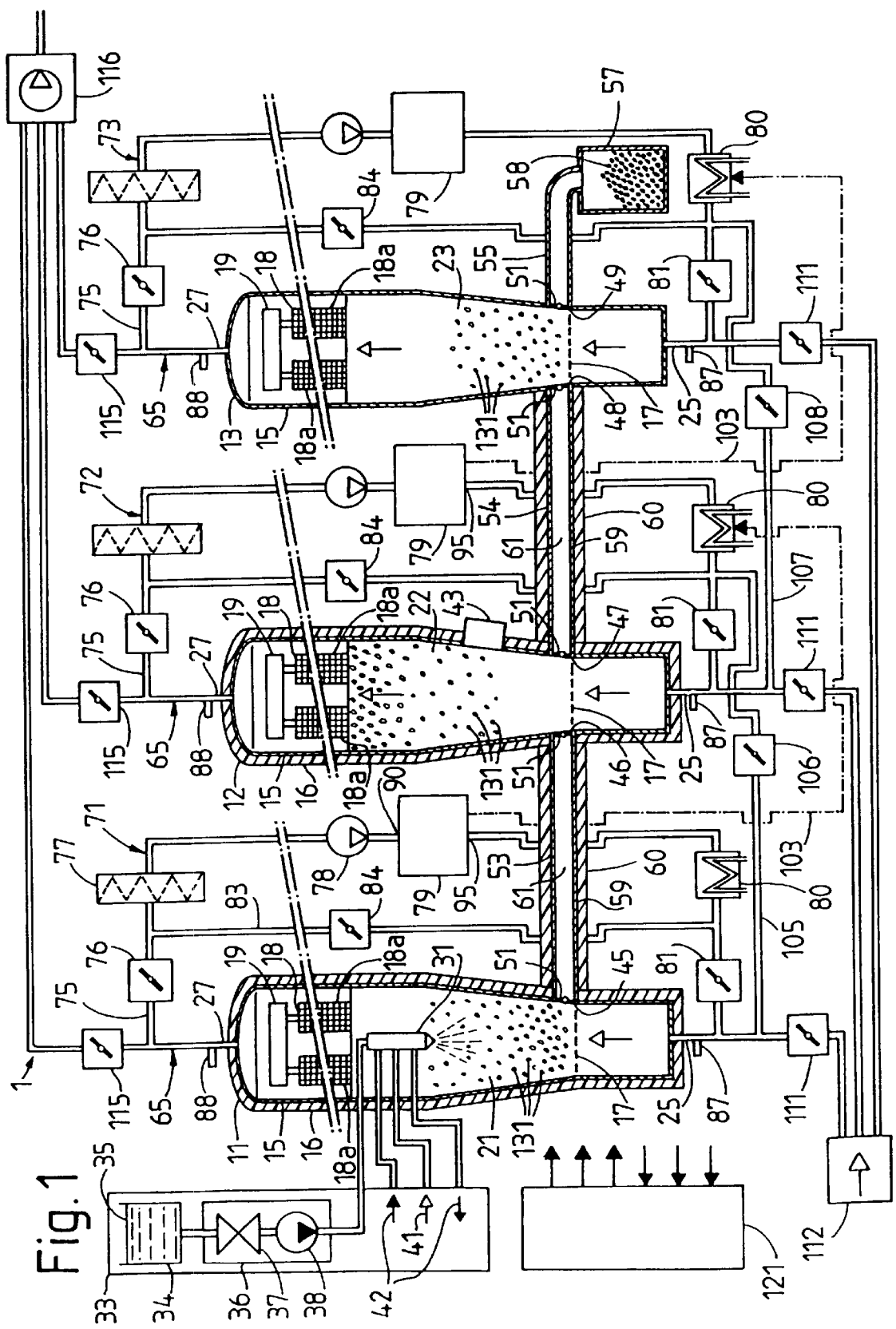
FIG. 1 shows a schematic diagram of an apparatus comprising three fluidized-bed containers, shown in vertical section, for the production and drying of particles.

The fluidized-bed apparatus shown in FIG. 1 and denoted as a whole by 1 has a plurality of separate fluidized-bed containers 11, 12, 13 which are shown only in simplified form, are arranged a small distance apart and are detachably fastened to a frame which is not shown, namely three of such fluidized-bed containers. These are designated below as first or second or third and last fluidized-bed container, in the order of the reference numerals. Each container 11, 12, 13 has a wall 15 which is shown only in simplified form and has a plurality of wall parts which are provided with flanges and the like and are connected detachably and tightly to one another. The walls 15 substantially comprise metallic materials, for example stainless steel but, for example, can also have at least one glass window each. The walls of the first container 11 and of the second container 12 are provided on the outside with a heat insulation 16 covering them at least almost on all sides and completely. According to FIG. 1, the wall of the third container 13 has no heat insulation but could possibly also be enclosed by such an insulation. Each fluidized-bed container 11, 12, 13 has a vertical axis and is in general—i.e. apart from at least one transparent window, fastening means, connections and the like—rotationally symmetrical with respect to this axis. Apart from the heat insulation absent in the case of a third container and apart from, for example, the different sizes, the three fluidized-bed containers have, for example, generally similar wall parts. The wall 15 has a casing which has, for example in each container, one cylindrical casing section each at the bottom and top and, in between, a casing section which widens conically upward.

In each container, a gas-permeable perforated base 17 having holes or slots is arranged and detachably fastened to the wall 15 approximately at the lower end of the conical casing section. The upper, cylindrical casing section contains a filter 18 which is shown only in simplified form. Said filter preferably has—in particular in the case of the second container 12—at least two filter elements 18a which are arranged side by side and can be separately cleaned and freed from particles adhering to them. Each filter element 18a has, for example, at least one vibratable holder arranged in the container and one gas-permeable, flexible filter cloth held by said holder and having at least one filter stocking and preferably a plurality thereof. The filter stockings can, for example, project approximately vertically upward away from an approximately horizontal holder part arranged on the bottom of the filter. For example, a filter cleaning device 19 likewise shown only in simplified form is furthermore present. Said device may have, for example, at least one vibrating device and/or ultrasound source for separately vibrating and/or treating by ultrasound the or each holder and the filter cloth held by it.

Figure 3:
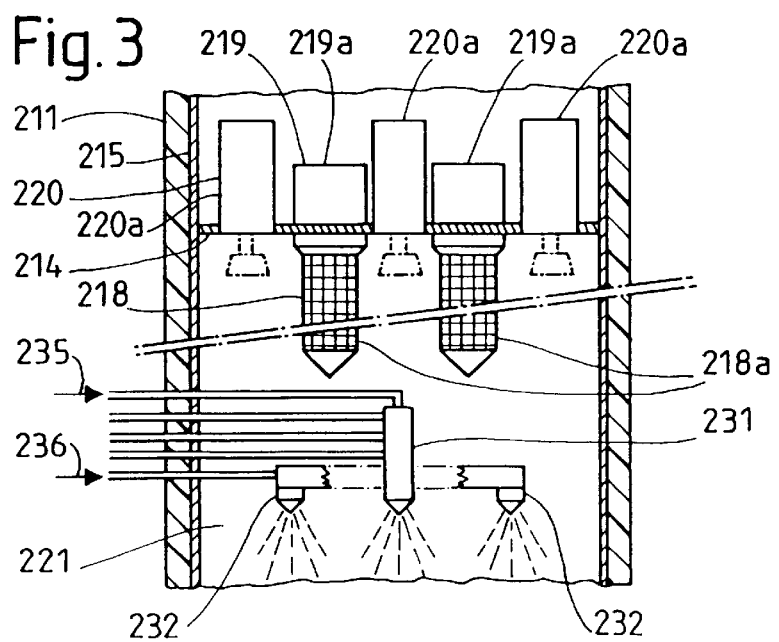

However, each filter element 18a can have at least one substantially dimensionally stable filter cartridge fastened rigidly in the container instead of at least one flexible filter cloth. Each filter cartridge can project approximately vertically downward away from an inner, for example horizontal wall part as shown in FIG. 3, described in more detail, for a variant of the apparatus. Each filter cartridge has a wall which at least for the most part is formed by a metallic, gas-permeable filtration element comprising a preferably multilayer woven wire fabric. This may also have, on the outside, a coating or casing of a plastic, for example a fluorine-containing plastic, such as polytetrafluoroethylene, or of a woven textile fabric, which covering or casing is of course gas-permeable. In this case, the filter cleaning device may have means for blowing out the or each filter cartridge with a cleaning gas.

The vertical dimensions of the filters 18 are approximately equal to the lengths of the stockings or cartridges of the filters or slightly greater than the lengths of the stockings or cartridges of the filters. The vertical filter dimension and the length of the stockings or cartridges of the filter 18 arranged in the second container 12 are preferably greater than the vertical filter dimensions and lengths of the stockings or cartridges of the filters 18 arranged in the first container 11 and in the third container 13. The vertical filter dimension and the length of the stockings or cartridges of the filter 18 arranged in the second container 12 are expediently at least 1 m, preferably at least 1.5 m and, for example, 2 m to approximately 3 m, depending on the size of the apparatus. The gas-permeable filter area of the filter 18 arranged in the second container 12 is preferably likewise greater than the gas permeable filter area of the filters 18 arranged in the two other containers 11 and 13. The gas-permeable filter area of the filters 18 and in particular of the filter 18 arranged in the second container 12 is also greater than the horizontal cross-sectional area of the interior container region at the lower end of the filter 18, which region contains the relevant filter 18. The gas-permeable filter area of the filter arranged in the second container is expediently at least 3 times, preferably at least 5 times and, for example, 15 times or even up to 30 times greater than said cross-sectional area.

Each fluidized-bed container 11, 12, 13 bounds an interior which is sealed gas-tight from the environment and is divided into three regions by the perforated base 17 and the filter 18. That region of the interior of the first, second and third container which is bounded at the lower end by the perforated base 17 and at the upper end at least for a large part by the filter 18 forms a first process chamber 21 or a second process chamber 22 or a third and last process chamber 23. Each container is provided with a gas inlet 25 below the perforated base 17 and with a gas outlet 27 above the filter 19.

The conical section of the second container 12 widens upward, for example only relatively slightly and possibly to a lesser extent than the conical sections of the two other containers 11, 13. At the lower end of the filter 18, the diameter of the second process chamber 22 is preferably at most 70% and, for example, at most about 50% greater than in the case of the gas-permeable perforated base 17. Since the filter 18 arranged in the second container 12 is preferably larger than the filters 18 arranged in the first and third containers, the interior of the second container is, for example, larger and in particular higher than the interiors of the two other containers. However, the three containers and their interiors can—apart from the heat insulation absent in the case of the third container—be formed approximately identically and have approximately identical shapes and dimensions.

A spray device has at least one spray nozzle 31 arranged in the first fluidized-bed container 11. Said spray nozzle has a nozzle housing and at least one outlet orifice arranged in the first process chamber 21 and directed downward. The spray nozzle 31 is in the form of, for example, a binary nozzle and is also provided with a heating device. The heating device has, for example, at least one heating fluid passage arranged in and/or on the nozzle housing. The spray device furthermore has a feed device 33 arranged outside the first container 11. The feed device 33 has a reservoir 34 for an at least partially liquid starting material 35 consisting of a solution and/or dispersion. The reservoir 34 is connected to the spray nozzle 31 via shut-off and metering means 36 and a pipe. The shut-off and metering means 36 have, for example, a valve 37 and possibly a pump 38. The feed device 33 furthermore has means which are not shown and are intended for feeding a atomizing gas 41 represented by an arrow, e.g. air or nitrogen, to the spray nozzle and for passing a heating fluid 42 represented by arrows and consisting, for example, of water through the or each heating fluid passage of the spray nozzle. It should be noted that the spray nozzle could also be formed, for example, as an ultrasound nozzle and/or could have at least one electrically heatable resist element instead of at least one heating fluid passage, and the feed device 35 could have power supply means for supplying electric current to the spray nozzle.

At least one of the fluidized-bed containers, namely the second container 12, may be provided with a heat energy source 43 in order to radiate heat energy in the form of electromagnetic radiation and/or waves, i.e. without heat conduction and convection, into the process chamber of this container and to the filter 18. The heat energy source 43 may be formed, for example, as an infrared lamp or as a microwave source and, in the latter case, can generate microwaves with a frequency of, for example, approximately 2.45 GHz. Instead or in addition, a heat energy source may be provided for heating the filter elements of the filter.

The first container 11 has a particle outlet 45. The second container 12 has a particle inlet 46 and a particle outlet 47. The third container 13 has a particle inlet 48 and a particle outlet 49. The passages and orifices of the particle inlets and of the particle outlets of all three containers 11, 12, 13 open directly above the perforated bases 17 or at most a very small distance away therefrom into the process chamber of the relevant chamber. Each particle inlet and particle outlet of the containers 11, 12, 13 are provided with a shut-off device 51 which has an adjustable shut-off element, for example a pivotable flap. The shut-off elements can alternatively be brought into a closed and an open position, in which they respectively shut off and open the orifice of the relevant particle inlet or outlet for the particles, the shut-off elements in the closed position closing the orifices even at least to some extent and preferably completely gas-tight. The shut-off elements are arranged in such a way that they close the orifices in their closed position more or less flush with the inner surfaces of the walls 15 of the containers.

The particle outlet 45 of the first container 11 is connected by a transfer connection 53 to the particle inlet 46 of the second container 12. The particle outlet 47 of the second container 12 is connected by a transfer connection 54 to the particle inlet 48 of the third container. The particle outlet 49 of the third container 13 is connected by a pipe 55 to a collecting container 57 for receiving the prepared particulate material 58. The two transfer connections 53, 54, which connect the three fluidized-bed containers 11, 12, 13 to one another in pairs, each have, for example, a short, straight, approximately horizontal, metallic pipe 59 which consists, for example, of stainless steel and which on the inside bounds a transfer passage 61, sealed tightly from the environment and intended for the particles, and which is surrounded on the outside by a heat insulation 60. Each transfer passage 61 can be alternatively shut off and opened by the shut-off devices 51. The pipe 55 may consist, for example, of a metallic pipe which is angled and/or curved and/or at least partly inclined downward away from the third fluidized-bed container 13 and is without heat insulation and may connect the last process chamber 23, for example likewise sealed tightly from the environment, to the interior of the collecting container 57.

The apparatus 1 furthermore has gas conveying means 65 for conveying process gas, for example air, during normal operation from the bottom to the top through the three fluidized-bed containers 11, 12, 13. The gas conveying means 65, together with the three fluidized-bed containers 11, 12, 13 form a first gas circulation 71, a second gas circulation 72 and third gas circulation 73, each coordinated with one of these containers. Each gas circulation has a pipe 75 connecting the gas outlet 27 to the gas inlet 25 of the relevant fluidized-bed container. Said pipe 75 bounds a passage and contains, in order from the gas outlet to the gas inlet, a valve 76, an absolute filter 77, a pump 78, a cooling and drying unit 79, a heating device 80 with a heat exchanger and a valve 81. A bypass 83 connects the entrance of the absolute filter 77 to the exit of the heating device 80. At the gas inlet 25 and at the gas outlet 27 of each container 11, 12, 13, a dew-point temperature sensor 87 or 88 is arranged in the pipe 75 and/or in the relevant container 12 itself. Furthermore, the fluidized-bed containers and/or gas circulations may also have temperature sensors, which are not shown and are intended for measuring the gas temperatures, and/or possibly flow meters for measuring the gas flow rates. Moreover, some of the devices belonging to the first and second and third gas circulations are likewise designated below with the words "first, second and third".

Figure 2:
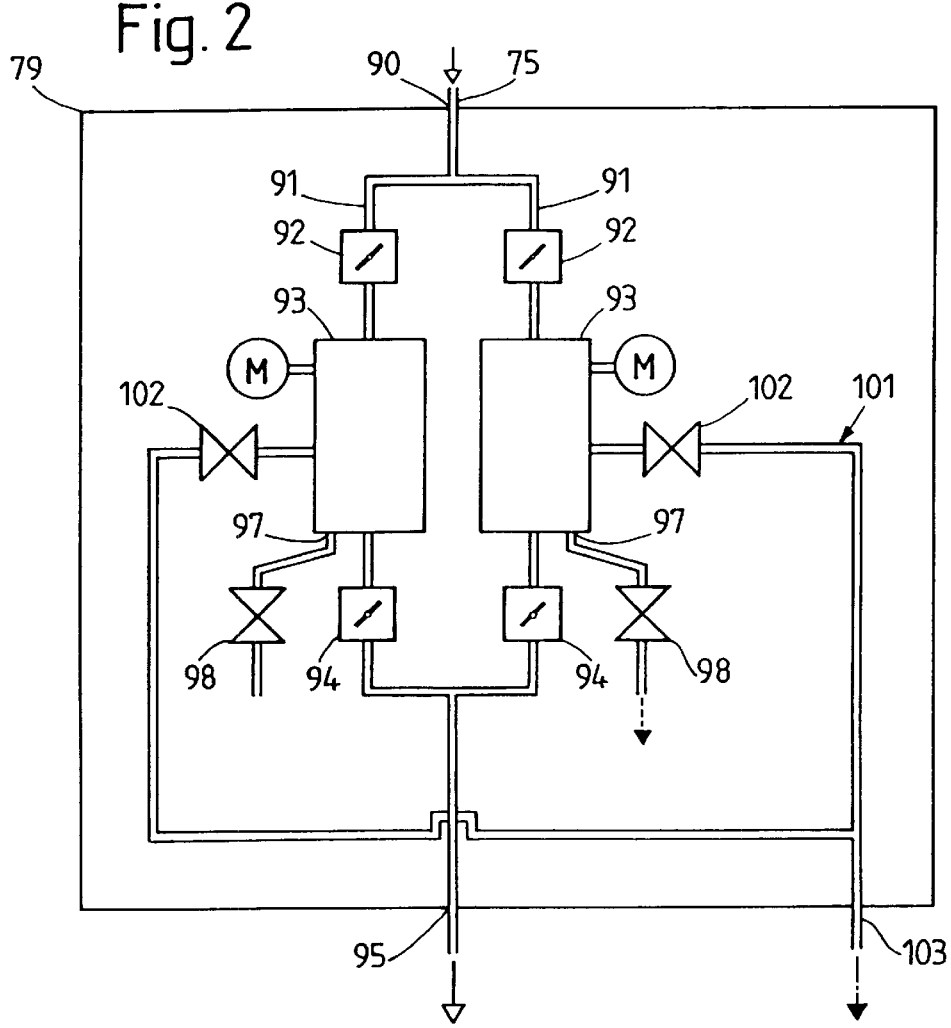
FIG. 2 shows a diagram of the cooling and drying units of the apparatus and FIG. 3 shows a vertical section through a part of a variant of a first fluidized container.

The first cooling and drying unit 79 of the first gas circulation is shown separately in FIG. 2. That section of the pipe 75 of the gas circulation which leaves from the pump is divided, at the gas entrance 90 of the cooling and drying unit 79, into two branch pipes 91, each of which has, in order along the flow path, a valve 92, a compression refrigerator 93 and a valve 94. After the exits of the valves 94, the two branch pipes 91 are united again into a single pipe, which forms the gas exit 95 of the cooling and drying unit 79. Each compression refrigerator 93 has a refrigeration circulation comprising a compressor which can be driven by an electric motor, an evaporator and a condenser. The evaporator of each refrigerator 93, together with further components, forms a heat exchanger for cooling the gas circulated in the gas circulation 71 through the pipe 75. Each refrigerator has a defrost liquid outlet 97 with a valve 98. Furthermore, heat recovery means 101 are also present at least in the cooling and drying units 79 of the first and second gas circulations 71 and 72, in order to recover heat released by the condensers of the refrigerators. The heat recovery means 101 have pipes which are connected to the condenser and which each have a valve 102. The second and the third cooling and drying units are formed similarly to the first one, but it is possible that no heat recovery means are present in the third cooling and drying unit.

The heat recovery means are provided with and/or connected to at least one heat transfer pipe 103 leading away from the cooling and drying unit 79 and, for example, also provided with and/or connected to a return pipe which is not shown, so that the waste heat can be transferred with a fluid, for example a liquid, to a point of use. The heat recovery means 101 of the cooling and drying unit 79 belonging to the first gas circulation 71 are connected, for example via the coordinated heat transfer pipe 103, to the heat exchanger of the heating device 80 of the second gas circulation 72. The heat recovery means 101 of the cooling unit 79 of the second gas circulation 72 are connected, for example, via the coordinated heat transfer pipe 103 to the heat exchanger of the heating device 80 of the third gas circulation 73. The heat exchanger of the heating device 80 of the first gas circulation is connected, for example likewise by a heat transfer pipe not shown, to the cooling and drying unit 79 of one of the gas circulations, for example the first gas circulation.

The gas inlet 25 of the first fluidized-bed container 11 is additionally connected, via a pipe 105 with a valve 106 to the exit of the heating device 80 of the second gas circulation 72. The gas inlet 25 of the second fluidized-bed container 12 is connected analogously via a pipe 107 with a valve 108 to the exit of the heating device 80 of the third gas circulation 73.

The gas inlet 25 of each fluidized-bed container 11, 12, 13 is connected via a valve 111 to a sterilizing agent and gas feed unit 112. The gas outlet 27 of each container 11, 12, 13 is connected via a valve 115 to a suction and/or evacuation device 116 which comprises at least one suction pump and, for example, also at least one filter and other elements.

The pumps for transporting gas have, for example, impellers and electric motors. The valves present in the gas-conveying pipes and the shut-off devices 51 have, for example, pivotable flaps and electrical adjusting devices for adjusting them. The valve 37 of the feed device 33 for feeding in the at least partially liquid material 35 and the other valves are, for example, likewise electrically controllable. The apparatus 1 also has a control device 121. This has, for example, a process control computer and other electronic elements, optical signal generators, at least one display and registration device, manually operated control elements and possibly pneumatic elements. Furthermore, electrical lines indicated by arrows and possibly compressed air lines are present. These lines connect the control device 121 to the electric motors of the various pumps and the compression refrigerators, the adjusting devices of the shut-off device 51, the dew-point temperature sensors and any other sensors and controllable components. The control device 121 is formed in such a way that the operation of the installation can be controlled either manually or automatically.

Below, the operation of the fluidized-bed apparatus 1 for the batchwise production and drying of a particulate material is explained.

The at least partially liquid starting material 35 present in the reservoir 34 consists of a solution and/or possibly a dispersion, i.e. a suspension and/or emulsion. The solvent and/or liquid dispersant usually consists at least substantially of water. The starting material contains at least one dissolved and/or dispersed component, for example at least one of the components mentioned in the introduction, for example a water-soluble therapeutic active substance.

The inner bounding surfaces of the walls of the three process chambers and, for example, also the remaining interior regions of the fluidized-bed containers 11, 12, 13, of the transfer connections 53, 54, of the pipe 55 and of the three gas circulations 71, 72, 73 and the parts present in the containers and gas circulations can be made sterile before and/or after the production of a particulate material. For this purpose, a sterilizing agent is passed into the fluidized-bed containers and gas circulations, for example from the sterilizing agent feed device 112 via the valves 111. Furthermore, sterilizing agent is passed in, as required, via additional pipes and valves not shown, also at other, otherwise insufficiently accessible points of the parts to be made sterile. The sterilizing agent consists, for example, of superheated steam having a temperature of at least or about 120° C. and a pressure of at least or about 200 kilopascal. However, the sterilizing agent could consist of dry, hot air having a temperature of at least about 160° C. and, for example, about 180° C. or of liquid alcohol or hydrogen peroxide, instead of consisting of steam. After the sterilization of the fluidized-bed containers and gas circulations, the sterilizing agent is removed from the fluidized-bed containers and gas circulations, for example via valves 115 through the suction and/or evacuation device 116, and is replaced by a process gas. This usually consists of air which, for example, is filtered and possibly sterilized in the sterilizing agent and gas feed device 112 and passed via the valves 111 into the fluidized-bed containers and gas circulations.

During normal operation, the process gas consisting of air is circulated in the three fluidized-bed containers 11, 12, 13 and the pipes 75 which, together with said containers, form the gas circulations 71, 72, 73, and is passed upward from below through the containers 11, 12, 13 and in particular their process chambers 21, 22, 23. The air is cooled in the valve and drying devices 79 and dried by freezing out the water vapor contained in the air. The cooled and dried air then flows through the heating devices 80 and is heated again therein, so that, on flowing into the fluidized-bed containers, it has a very low relative humidity and the desired temperature.

It is assumed below that the at least partially liquid starting material 35 consists of a solution having a eutectic temperature which is at least −30° C. and at most 0° C. and is, for example, in the range from −25° C. to −5° C. The air circulated in the three gas circulations is cooled, in the cooling and drying units 79, to a temperature which is, for example, about −50° C. to about −80° C. After cooling in the cooling and drying unit 79, the air circulated in the first gas circulation 71 is heated slightly again in the heating device 80 so that, on flowing into the first fluidized-bed container 11 and in the first process chamber, it has a temperature which is at most −30° C., preferably −80° C. to −40° C. and, for example, about −60° C. The air circulated in the second gas circulation 72 is cooled in the second cooling and drying unit 79, for example approximately to the same temperature as the air circulated in the first gas circulation is cooled in the first cooling and drying unit. The air cooled and dried by the second cooling and drying unit is heated to a greater extent in the heating device 80 of the second gas circulation than the air circulated in the first gas circulation, so that the air flowing into the second fluidized-bed container 52 has a temperature which is lower than the eutectic temperature but is only slightly below this. The temperature of the air passed into the second container 12, on flowing into the container 12, can in fact expediently be at most 20° C., preferably at most 10° C. and, for example, even only at most or about 5° C. below the eutectic temperature and, for example, can have a value between −30° C. and almost 0° C. The temperature of the air passed as process gas into the second container 12 is expediently at least 10° C., preferably at least 20° C. and, for example, at least 30° C. higher than the temperature of the air passed as process gas into the first container 11. The air circulated in the third gas circulation 73 is cooled in the third cooling and drying unit 79, for example likewise approximately to the same temperature as in the cooling and drying units of the gas circulations 72 and 73, but is then heated, in the heating device 80, to a temperature which is greater than the eutectic temperature and greater than 0° C., preferably 10° C. to 30° C., and, for example, approximately equal to the normal room and ambient temperature, i.e. for example about 20° C.

For the production of particles, the feed device 33 feeds to the spray nozzle 31 at least partially liquid starting material 35 and atomizing gas 41 which, for example, consists of filtered and dried compressed air. The temperature of the atomizing gas 41 should be above the eutectic temperature and may be, for example, approximately equal to the normal room temperature and therefore about 20° C. The feed device 33 furthermore passes a heating fluid 42 through the spray nozzle 31 so that the latter does not freeze up during atomization of the material 35.

The pressure of the process gas circulated in the gas circulations during the production of a particulate material and present in the fluidized-bed containers, in particular in their process chambers 21, 22, 23, is, for example, approximately equal to the ambient air pressure. However, it should be mentioned that, in the case of certain types of materials, it might be expedient at least temporarily to generate, at least in one of the process chambers, in particular in the second process chamber 22 and possibly also in the first process chamber 21, a pressure which is below the normal ambient air pressure. A reduced pressure may be temporarily generated even in the third process chamber 23. The pressure in the first and/or second and optionally third process chamber is then preferably at least 20 hectopascal, preferably at most 900 hectopascal or even only at most 500 hectopascal and, for example, about 50 to 300 hectopascal. If a reduced pressure is to be present during the production and treatment of a particulate material in at least one of the fluidized-bed containers, air can be temporarily sucked out of the relevant fluidized-bed container and gas circulation before the production of the particles by means of the suction and/or evacuation device 116 via the coordinated valve 116.

For the production of a batch of a particulate material, a corresponding amount of the at least partially liquid starting material 35 is atomized in the first process chamber 21 in an atomization and freezing phase by means of the spray nozzle 31. Droplets whose diameter is preferably less than 100 $\mu$m and, for example, about 10 $\mu$m to 30 $\mu$m are produced thereby. If required, smaller droplet diameters in the range from 1 $\mu$m to 10 $\mu$m or even below 1 $\mu$m can be produced by means of at least one special spray nozzle and possibly an additional device. The droplets come into contact with the cold air flowing upward from below through the first process chamber and having, for example, a temperature of about −60° C. This air serving as process gas forms a freezing fluid and cools the droplets coming into contact with it rapidly below the eutectic temperature so that the droplets freeze. The fine droplets formed during the atomization solidify very rapidly and virtually without separation to give solid particles 131. These are fluidized by the air flowing upward in the process chamber and form a fluidized bed. The atomization of the desired amount of the at least partially liquid material does of course take a certain time, which is, for example, approximately in the range from 5 min to 30 min. In particular, the initially frozen particles are therefore slightly dried by freeze-drying during the atomization process even in the first process chamber, solvent and/or dispersant being removed from the particles by sublimation. In this context, it should be noted that the particles have a tendency to agglomerate during the freezing process and/or directly thereafter. Slightly larger particles having approximately raspberry shapes can form from a few original particles having a size of, for example, about 20 $\mu$m. It may therefore be advantageous to fluidize all particles after the end of the atomization process in the first container for a short period and to dry them slightly by freeze-drying in a first freeze-drying phase, so that the particles are not agglomerated to give undesirably large particles during the subsequent transfer into the second fluidized-bed container and during the freeze-drying taking place on this filter. However, any drying process taking place after the end of the atomization process has, for example, only a short duration, for example of a few minutes, so that only a relatively small part of the originally liquid solvent and/or dispersant originally present in the particle is removed from the particles during their entire residence time in the first fluidized-bed container.

During normal operation, the shut-off devices 51 and the valves 106, 108 are closed so that no particle transfer between different fluidized-bed containers and no gas or air exchange between different gas circulations take place. For the transfer of the particles present in the first process chamber 21 into the second process chamber, the shut-off devices at the ends of the pipe 53 connecting the first process chamber 21 to the second process chamber 22 and the valve 106 connecting the first gas circulation 71 to the second gas circulation 72 are temporarily opened. Furthermore, the gas or air circulation in the first and second gas circulation is influenced by means of the valves 76 and 81 of these circulations in such a way that process gas, i.e. air, from the first process chamber 21 transports the particles present therein pneumatically through the transfer passage 61 of the transfer connection 53 into the second process chamber 22. The temperature of the particles during the transfer remains below the eutectic temperature.

When the particle batch has been transported from the first into the second fluidized-bed container 12, the shut-off devices 51 of the pipe 53 and of [sic] the valve 106 are closed again. The particles 131 entering the second fluidized-bed container can be raised in its process chamber 22 by means of the air flowing upwards through said process chamber from below and can be further dried in a second freeze-drying phase or main freeze-drying phase.

The particles 131 can be temporarily fluidized per se in the second process chamber 22. The flow rate of the air passed as process gas through the second process chamber 22 is however preferably regulated and measured in such a way that the particles 131 passing from the transfer connection 53 into the second process chamber 22 are fluidized at most during a short period and, after a short duration of fluidization or immediately after entry into the second process chamber, are raised up to filter 18 and are caused to rest against one of the gas-permeable surfaces of the filter elements 18a of the filter 18. It has in fact been found that the drying process in freeze-drying is substantially accelerated compared with the drying in a fluidized-bed if the particles rest against and are suspended from the filter 18. In order to ensure that the particles resting against the filter are agglomerated as little as possible to form larger particles, they can—as already mentioned—be slightly predried for a short period in the first process chamber and/or in the second process chamber before being raised to the filter arranged in the second container. Furthermore, it is expedient to detach the particles from the filter temporarily from time to time. For this purpose, the at least two filter elements 18a of the filter 18 can be cleaned separately and alternately by means of the filter cleaning device 19 by vibration and/or by treatment with ultrasound and/or by blowing out and can be freed at least substantially from the particles resting against them. The particles detached from a filter element can then fall down a greater or lesser distance into the free process chamber, may possibly be fluidized during a short period in the process chamber by means of the air serving as process gas and then be caused again to rest against one of the filter elements 18a. Each filter element 18a of the filter 18 is preferably cleaned at least every hour and, for example, after in each case about 30 min, by vibration or blowing out for a period which is at most 3 min and, for example, about 30 s to 1 min. The freeze-drying phase in the second process chamber is carried out, for example, in such a way that at least most particles 131 rest against one of the filter elements 18a for at least 30%, expediently at least 50%, preferably at least 70% and, for example, at least or about 90% of the total freeze-drying period. The latter is understood as meaning the total period during which the particles are dried after the end of the atomization of liquid material and of the freezing process in the second process chamber and possibly beforehand even in the first process chamber.

As already described, the gas passed into the second process chamber has a temperature which is higher than the temperature of the gas passed into the first process chamber and, for example, only slightly below the eutectic temperature. The particles therefore are effectively, rapidly and nevertheless gently dried in the second container by freeze-drying. In the freeze-drying process taking place in the second container 12, a substantial part, for example at least about 50% of the solvent and/or dispersant originally contained in the droplets or particles, is removed from the particles by sublimation. During the freeze-drying, the particles acquire a loose, porous structure, so that they are subsequently lyophilic and in particular hydrophilic and very readily soluble in water.

After the particles in the second fluidized-bed container 12 have been dried, the process gas circulation through the second process chamber is reduced and/or completely terminated. Furthermore, all filter elements 18a of the filter 18 coordinated with the second process chamber are freed from the particles adhering to them with the aid of the filter cleaning device, so that said particles fall downward. The particles are then transferred into the third fluidized-bed container. This is effected analogously to the previously described transfer from the first into the second fluidized-bed container by temporary opening of the shut-off devices 51 present in the connections of the transfer connection 54 to the containers 12 and 13 and of the valve 108 with the aid of valves of the second and third gas circulation, so that the particles are pneumatically transported through the transfer passage 61 of the transfer connection 54.

The particles are then fluidized in the third process chamber 23 with the air passed through it and are heated to a temperature which is above the eutectic temperature and above 0° C. and which is, for example, approximately equal to the normal room temperature. Further residual moisture is removed from the particles. The porous, lyophilic and hydrophilic structure of the particles is not adversely affected by this "conventional" drying taking place at above the eutectic temperature.

The particles are now transported from the third container 13 into the collecting container 57. For this purpose, the shut-off device 51 connecting the third container 13 to the pipe 55 is temporarily opened. Furthermore, for example, the valve 76 of the third gas circulation is temporarily at least partly closed, and fresh air may be passed into the third gas circulation from the sterilizing agent and gas feed device 112 via the valve 111 connecting this to the third fluidized-bed container. The particles entering the collecting container 57 then form the above-mentioned, particulate material 58.

The three process chambers, the passages of the three gas circulations and the transfer passages are sealed substantially gas-tight from the environment by walls and other parts during the freezing and subsequent drying of the particles of the three process chambers and the transfer of the particles from one process chamber into the next process chamber. The entire production and processing of the particles can therefore be carried out aseptically. The particles can, if necessary, furthermore be transported, aseptically and in a state sealed from the environment, from the third process chamber into the collecting container 57. Since the particles passed out of the third container 13 have a temperature approximately identical to the normal room temperature, they may however come into direct contact with the surrounding air without atmospheric moisture being deposited on them if this is permitted with respect to the required purity. Furthermore, any surrounding air penetrating into the third container can likewise cause no condensation of atmospheric moisture in the third container.

Now that the most important process steps have been described above, it is intended also to explain some details and advantages.

During the freezing process, the air flowing through the first process chamber is heated. On the other hand, the particles contained in a container remove heat from the air passed from the bottom upward through this container and the particles during the drying, in particular the heat of sublimation during freeze-drying. The air and the particles are therefore cooled during the drying. The temperature of the air passed through the first fluidized-bed container 11 should have a temperature which is substantially below the eutectic temperature and namely at least 10° C., preferably at least 20° C., even better at least 30° C. and, for example, about 40° C. or even lower than the eutectic temperature, during the atomization and freezing phase and, for example, also during any first freeze-drying phase taking place in the first process chamber, both on flowing into the first container 11 and in the entire region of the first process chamber. As already described, the temperature of the air in the second process chamber is then higher. The flow rate of the air passed through the second process chamber and the temperature of this air on flowing into the second process chamber are preferably established so that, during the entire freeze-drying process taking place in the second process chamber, the air and the particles always have a temperature which is at most 20° C., preferably at most 10° C. and, for example, at most 5° C. and at least 1° C. below the eutectic temperature.

During the fluidization, freezing and drying of particles 131, also particles formed by freezing and relatively fine dust particles formed from these by abrasion can also be raised to the filters 18 of the first and third fluidized-bed containers 11 and 13, respectively, in said containers and can remain suspended from the filters. The particles suspended from the filters can, if required, be detached with the aid of the filter cleaning devices 19, by vibration or blowing away from the filters, so that they fall downwards. Such "dry" filter cleaning operations can, for example, be carried out in each case before a batch of particles is transported from a container into the next container or into the collecting container 57.

During the development of a novel product, for example, only a single batch of particles can be frozen in the first container and slightly dried and then further treated in the other containers, in particular dried. Air may have to be circulated only through the container which currently contains the particles.

The apparatus can be designed, for example, to freeze and/or to dry a particle batch having a total mass of, for example, about 0.1 kg to about 1 kg in one container. For commercial production, in a quasi-continuous mode of operation, various particle batches can then be treated simultaneously in all three containers and successively transferred from one container into the respective next container. This makes it possible also to produce relatively large amounts of material using relatively small fluidized-bed containers suitable for development, if required without a scale-up procedure and without revalidation. Since each fluidized-bed container can always be kept approximately at the same temperature during the quasi-continuous treatment of a plurality of batches, the apparatus also requires only little energy.

The compression refrigerators of the cooling units 79 generate waste heat. At least in the quasi-continuous operation, waste heat is fed with a fluid from the cooling and drying units 79 of the first gas-circulation 71 to the heat exchanger of the heating device 80 of the second gas circulation 72 and is used there for heating the air dried and cooled in the second gas circulation by the cooling and drying unit. Furthermore, waste heat of the cooling and drying unit 79 of the second gas circulation is used for heating the air passed in the third gas circulation from the cooling and drying unit 79 to the heat exchanger of the heating device 80. Moreover, waste heat from one of the cooling and drying units can also be fed to the heating device of the first gas circulation. This utilization of the waste heat generated by the cooling and drying units 79 likewise contributes to a low energy consumption.

By means of the dew-point temperature sensors 87, 88, it is possible to measure the dew points of the air which flows into a fluidized-bed container or out of said container. The difference between these dew points is a measure of the amount of water removed from the particles during drying. This in turn makes it possible to establish and to control the duration for which a particle batch is dried in a container.

The heat energy source 43 which may be present at least in the second container 12 and is shown only schematically makes it possible to supply energy in the form of electromagnetic radiation and/or waves to the particles 131 present in the free region of the second process chamber and/or resting against the filter and thus to heat the particles, this energy supply being possible without contact, without heat conduction and without convection and thus without prior heating of the process gas. Instead of or additionally, heat can be supplied to the particles resting against the filter elements 18a of the filter 18 by heating the filter elements. Moreover, this heat supply can, if required, be simply and rapidly controlled, switched on, changed and switched off, so that the temperature of the particles during the entire freeze-drying phase taking place in the second process chamber can be regulated to a value which is just below the eutectic temperature.

The air flowing through the containers 11, 12, 13 takes up moisture removed from the particles 131. Said moisture is frozen out by the evaporators of the refrigerators 93. Equipping each cooling and drying unit 79 with two refrigerators 93 makes it possible alternately to use these refrigerators for cooling and to defrost them. During defrosting, the resulting liquid is discharged from the relevant refrigerator in each case through the defrost liquid outlet 97.

The first fluidized-bed container 211 shown partly in FIG. 3 is, for example, formed similarly to the first fluidized-bed container 21, has a metallic wall 215 and contains a process chamber 221 which is bounded at the top by an inner wall part 214 and a filter 218. This has, for example, at least one filter element 218a fastened to the inner wall part 214 of the container, namely at least two filter elements 218a each consisting of a filter cartridge. These filter elements 218a or filter cartridges can be formed identically to the filter cartridges described as a possible variant of the filter elements 18a. A filter cleaning device 219 coordinated with the filter has, for each filter cartridge, a gas cleaning member 219a connected to it and intended for blowing out the filter cartridge.

The apparatus having the fluidized-bed container 211 furthermore has a wet cleaning device 220 for wet cleaning, i.e. washing and flushing, of parts of the interiors of the various containers, in particular of the process chambers, and of the passages of the transfer connections, possibly of parts of the passages of the gas circulations, of the walls and other parts bounding these interiors and passages and of parts contained in these interiors and passages. The wet cleaning device has, for example, spray devices 220a which are arranged at various points and some of which are shown in FIG. 3 and are denoted by 220a. Each of the spray devices 220a shown has a housing fastened to the inner wall part 214 and a displaceable spray nozzle with a rotatable nozzle head. The spray nozzle can be moved from a rest position outside the process chamber into a spray position which is indicated by a dot-dash line and in which it projects into the process chamber in order to spray a cleaning liquid against those outer surfaces of the filter cartridges 218a which are adjacent to the process chamber, and against the inner surface of the metallic container wall enclosing the process chamber 221.

The wet cleaning device makes it possible to wash and to flush the process chambers, perforated bases, filters, transfer passages and, if necessary, other regions of the interiors of the fluidized-bed containers and parts of the passages of the remaining gas circulations before and/or after the production of an amount of a particulate material, in the state sealed from the environment, with a cleaning liquid. As already described for the apparatus according to FIG. 1, the apparatus can then likewise be made sterile in the state sealed from the environment. The containers and other parts to be cleaned should as far as possible have no dead spaces and should be formed in such a way that the cleaning liquid can flow away readily everywhere. The processes for enabling the apparatus to be dry-cleaned and wet-cleaned and made sterile can—like the actual method for production—be automatically controlled.

The filter cartridges of the filters can—as mentioned in the description of FIGS. 1 and 3—have a metallic filtration element and be connected to a cleaning device in order to clean the filter cartridges by a dry method by blowing out. Filter cartridges of this type and cleaning devices for blowing them out are disclosed, for example, in U.S. Pat. No. 5,868,807 A and the corresponding EP 0 781 585 A. The wet cleaning device 220 shown in FIG. 3 is formed, for example, partly identically or similarly to that in U.S. Pat. No. 5,766,281 A and in the corresponding EP 0 781 587 A. The content of these documents is hereby incorporated by reference in this description, where there are no contradictions.

The process chamber 221 also contains a spray nozzle 231 which, for example, is formed similarly to the spray nozzle 31 as a binary nozzle and/or possibly as an ultrasound nozzle and serves for atomizing an at least partially liquid starting material 235. Furthermore, a few spray nozzles 232 distributed around the spray nozzle 231 are present for spraying a coolant, for example a liquefied, cryogenic gas, for example liquid nitrogen, or possibly dry ice ($CO_2$) in the dry, pulverulent state, with the aid of a gas or of carbon dioxide ($CO_2$) dissolved in acetone, into the process chamber. Furthermore, process gas is passed upward from below through the first process chamber 221 and circulated in a gas circulation in order to fluidize the particles formed by freezing, for example analogously to the apparatus according to FIG. 1.

The process gas passed from below through a gas-permeable perforated base into the first process chamber 221 is cooled, from [sic] being passed in, preferably to a temperature which is less than 0° C., better at most −20° C. and, for example, about −60° C. to −30° C. The atomized coolant forms, so to speak, a curtain which encloses a region of the jet formed by the atomized starting material 235. The atomized coolant mixes with the process gas passed from below into the first process chamber 221, vaporizes and then forms a component of the process gas. Consequently, the process gas is considerably cooled at least in a freezing region, i.e. at least in a region of the first process chamber, namely at least in the environment [lacuna] mouth of the spray nozzle 231. The mixture of process gas originally passed in from below and of atomized and more or less vaporized coolant then forms a cold freezing fluid whose temperature in the freezing region is preferably at most −30° C. and, for example, about or at most −60° C., so that the droplets formed from the atomized starting material 235 rapidly freeze.

In the variant of the first container which is shown in FIG. 3, however, the filter 18 and the gas outlet arranged above it and serving for removal of the filtered process gas could be omitted and the first process chamber 221 could be sealed tightly everywhere from the top region at the wall part 214. The process gas passed from below through the gas-permeable perforated base into the first process chamber during the freezing process and the gas formed by vaporization of coolant can then be sucked together through a transfer connection into the second process chamber. The transfer connection connecting the first process chamber 221 to the second process chamber can be in the form of, for example, a fluidizing channel or fluidizing duct and can have a gas-permeable perforated base at least in parts. The fluidizing channel or the fluidizing duct is, for example, approximately horizontal and about 0.2 m to 2 m and preferably 0.5 m to 1 m long. During the transfer of particles, cooled process gas is then passed from below through the perforated base of the fluidizing duct into that region of the interior of the fluidizing duct which is present above the perforated base and serves as a transfer passage.

The perforated base bounding the first process chamber at the bottom and the perforated base of the fluidizing duct are, for example, in the form of a punched-screen or bar-screen or so-called Conidur screen base. A Conidur screen base has holes, in particular slots, which guide the gas flowing through in an inclined direction making an angle with a vertical or in a virtually horizontal direction.

The particles formed in this variant of the apparatus during the freezing process by freezing of droplets in the first process chamber 221 can fall downwards in the first process chamber and are then transported continuously, together with the process gas, into the fluidizing channel and through the latter into the second process chamber. The particles may possibly already be slightly fluidized in the first process chamber and then transported and simultaneously fairly strongly fluidized in the fluidizing duct. During this, the particles are already slightly dried by freeze-drying. The transfer through the fluidizing duct is effected in a state sealed from the environment, analogously to that described above for the pneumatic transport (without particular fluidization). The process gas passed into the first process chamber and into the fluidizing duct and flowing through the latter into the second process chamber is sucked, together with the process gas passed from below through a perforated base into the second process chamber, upward through the second process chamber and through a filter out of the second process chamber. When a batch of particles has been formed by successive freezing of droplets and has been transported into the second process chamber, the supply of process gas to the first process chamber and to the fluidizing duct is stopped and the transfer connection formed by the fluidizing duct is closed, for example by means of a shut-off device.

Unless stated otherwise above, the particles produced in the first container 211 by freezing can be treated in a manner identical with or similar to that in the case of the apparatus according to FIG. 1, in particular can be dried batchwise in the second process chamber and then in the third process chamber.

The apparatuses and methods can be modified in various ways. First, features of the apparatus and method variants described with reference to FIGS. 1 to 3 can be combined with one another. In the case of the apparatus shown in FIG. 1, for example, the transfer connection connecting the first process chamber to the second process chamber, or each transfer connection, could be in the form of an approximately horizontal fluidizing duct which contains a gas-permeable perforated base in its interior.

The apparatus could furthermore only have two containers, each with a process chamber, instead of three containers. In this case, for example, the freezing process and possibly also a first, brief freeze-drying can be carried out in the process chamber of the first container. The main freeze-drying phase, the heating to room temperature and the subsequent drying above the eutectic temperature, can then be carried out in the second container. Instead, the freezing process and the entire freeze-drying can be carried out in the first container at a temperature below the eutectic temperature. Air at approximately room temperature can then be passed through the second container in order to heat the particles approximately to room temperature. Such apparatuses having only two containers and two process chambers likewise permit a quasi-continuous production of particles, in which the two process chambers are temporarily sealed off from one another and contain different particle batches. However, the apparatus could also have more than three fluidized-bed containers, so that the drying process could be divided among more containers and process chambers.

The pipe 55 which serves for removing the particles from the last fluidized-bed container can also be provided with a lock which prevents, for example, nonsterile surrounding air from entering the last fluidized-bed container during and after the removal of the particles. Such a lock may be expedient in particular if the air circulated in the last gas circulation during normal operation has a pressure below the ambient air pressure. Furthermore, the particle outlet 49 of the last container 13 and/or the pipe 55 could be provided with a cyclone. If the air circulated in the various gas circulations has different pressures, at least one of the transfer connections 53, 54 connecting the various containers can also be provided with a lock.

Moreover, each cooling and drying unit 79 could have heat recovery means which are connected to the heat exchanger of the heating device 80 of the same gas circulation, so that the heat can be used again within each gas circulation.

Furthermore, the process gas passed upward from below through the fluidized-bed containers and the atomizing gas could consist of nitrogen or of another oxygen-free gas instead of air. In addition, liquid nitrogen or another, liquefied gas could also be sprayed into the first process chamber in order to cool and to freeze the atomized solution and/or dispersion as rapidly as possible. Furthermore, the spray nozzle could be in the form of an airless high-pressure nozzle instead of a binary nozzle.

It is possible to atomize an at least partially liquid material 35 which consists of a solution and/or dispersion and has no eutectic temperature. In this case, the term "eutectic temperature" in the preceding part of the description should—where reasonable—be replaced in each case by the term "lowest freezing point". This is understood as meaning the temperature at which the at least partially liquid material completely solidifies at all possible concentrations of its components on cooling.

What is claimed is:

1. Method for producing a particulate material (58) from an at least partially liquid material (35, 235) containing a solvent and/or dispersant, characterized in that the at least partially liquid material (35, 235) is atomized to give droplets and these are frozen by contact with a freezing liquid to give particles (131), that the particles (131) are then at least partly dried by freeze-drying in a process chamber (22) having a filter (18) at the top, and that, during the freeze-drying, process gas is passed upward from below through the process chamber (22) and through the filter (18) in such a way that at least a substantial part of the particles (131) rest against the filter (18) at least during a substantial part of the freeze-drying taking place in the process chamber (22).

2. Method according to claim 1, characterized in that particles (131) resting against the filter (18) during the freeze-drying are detached from the filter (18) from time to time and then caused to rest against the filter (18) again by means of the process gas and further dried on said filter.

3. Method according to claim 2, characterized in that the filter (18) used for the freeze-drying has at least one filter element **(18*a*) which is freed, at least every hour, at least from the major part of the particles (131)** resting against it.

4. Method according to claim 1, characterized in that the filter (18) used for the freeze-drying has at least two filter elements **(18*a*) which are freed, during the freeze-drying, separately and alternately from particles (131)** resting against them.

5. Method according to claim 3, characterized in that the or each filter (18) is vibrated and/or treated with ultrasound and/or blown out to detach the particles (131) adhering to it.

6. Method according to claim 1, characterized in that a particle batch is formed by successive atomization of liquid and freezing of the droplets and that at least most of the particles (131) rest against the filter (18) for at least 30%, expediently at least 50% and preferably at least 70% of a freeze-drying period in which the particles (131) are dried after production of the particle batch by freeze-drying.

7. Method according to claim 1, characterized in that the process gas passed into the process chamber (22) containing the particles (131) for freeze-drying said particles has a higher temperature than the freezing fluid, the freezing fluid preferably having a temperature which is at most −30° C. and, for example, −80° C. to −40° C., and the temperature of the process gas passed into the process chamber (22) containing the particles (131) for freeze-drying said particles expediently being at least 10° C. higher, preferably at least 20° C. higher and, for example, at least 30° C. higher than the temperature of the freezing fluid and, for example, at least −30° C. and, for example, less than 0° C.

8. Method according to claim 1, characterized in that, for the formation of the freezing fluid, process gas is cooled and is passed into a freezing region serving for freezing the droplets and/or that a coolant (236) which preferably comprises a liquefied gas, for example liquid nitrogen, or dry, pulverulent carbon dioxide or acetone and carbon dioxide dissolved therein is sprayed into the freezing region, for example at least one jet of the at least partially liquid material (235) being produced and, for example, coolant (236) being atomized around a region of this jet.

9. Method according to claim 1, characterized in that the atomization and freezing of the at least partially liquid material (35, 235) is effected in a first process chamber (21, 221) which is connected by a transfer connection (53) to the second process chamber (22) serving for the freeze-drying, that process gas is passed into the first process chamber (21, 221), during the atomization and freezing of the at least partially liquid material (35, 235), through a gas-permeable base (17) arranged at the bottom of the first process chamber (21, 221), and that the particles (131) formed in the first process chamber (21, 221) by freezing are transferred with gas through the transfer connection (53) into the second process chamber (22), a particle batch being produced, for example, by successive freezing of the particles (131) in the first process chamber (21, 221), the particles (131) already present being fluidized during the production of fresh particles (131), and the particles (131) being transferred after the freezing of the entire particle batch into the second process chamber (22), or, for example, the particles (131) formed by freezing being transferred continuously during the production of a particle batch from the first process chamber (21, 221) into the second process chamber (22), and the transfer connection (53) possibly being in the form of a fluidizing channel having a base which is gas-permeable at least in parts and gas possibly being passed through a gas-permeable base of the transfer connection (53) into the latter during the transfer of the particles (131), so that the particles (131) are, for example, fluidized in the transfer connection (53) and, for example, already subjected to a freeze-drying.

10. Method according to claim 1, characterized in that, after the freeze-drying in the process chamber (22) used for this, the particles (131) are transferred through a transfer connection (54) into another, last process chamber (23), the process gas which has a temperature which is more than 0° C. and, for example, at least 10° C. to, for example, at most 30° C. is passed upward from below through this last process chamber (23), and that the particles are fluidized and dried in the last process chamber (23).

11. Method according to claim 9, characterized in that walls (15, 215), gas-permeable bases (17), filters (18, 218) and other parts which bound the process chambers (21, 22, 23) and a passage (61) of the or each transfer connection (53, 54) are made sterile, before and/or after the production of an amount of the particulate material (58), in a state substantially sealed from the environment, by passing in a gaseous and/or a liquid sterilizing agent, for example steam, hot air or liquid alcohol or hydrogen peroxide.

12. Method according to claim 9, characterized in that particles (131) are frozen and dried batchwise and that at least two different process chambers (21, 22, 23, 221) are sealed from one another at least temporarily and simultaneously contain different batches of particles (131).

13. Method according to claim 1, characterized in that gas conveying means (65) are used which, together with the process chamber (22) serving for the freeze-drying, form a gas circulation (72), that the process gas is circulated in the gas circulation (72) through the process chamber (22) in normal phases of operation and that the circulated process gas, after emerging from the process chamber (22) serving for the freeze-drying, is cooled and dried by means of a cooling and drying unit (79) and is then heated in a heating device (80) having a heat exchanger before being passed into the process chamber (22), for example waste heat which is generated by the cooling and drying unit (79) belonging to this gas circulation (72) or, for example, by a cooling and drying unit (79) which belongs to another gas circulation (71) with another process chamber (21, 221) being passed to the heat exchanger and being used therein for heating a process gas.

14. Method according to claim 1, characterized in that energy for heating the particles (131) is supplied to the particles (131) at least during a part of the freeze-drying by electromagnetic radiation and/or waves, for example infrared light and/or microwaves, and/or via the filter (18).

15. Method according to claim 1, characterized in that the pressure of the process gas in the process chamber (22) used for the freeze-drying is lower than the ambient air pressure during at least a part of the freeze-drying, and is possibly at most 900 hectopascal and, for example, 50 hectopascal to 300 hectopascal.

16. Method according to claim 1, characterized in that the originally at least partially liquid material (35, 235) comprises at least one active substance and/or excipient for a drug and/or microorganisms and/or cells for the treatment of humans and/or animals and/or at least one substance for diagnostic purposes, the material being, for example, heat-sensitive.

17. Method according to claim 1, characterized in that the filter (18) bounding the process chamber (22) used for the freeze-drying at the top has a gas-permeable filter area which is greater than a cross-sectional area of a container interior region, containing the filter (18), at the lower end of the filter (18), this filter area expediently being at least 3 times and preferably at least 5 times greater than said cross-sectional area, the filter (18) preferably having at least one approximately vertical, gas-permeable cartridge or at least one approximately vertical, gas-permeable stocking having a length which is expediently at least one 1 m, preferably at least 1.5 m and, for example, at least 2 m, and the process chamber (22) used for the freeze-drying widening upward preferably at least in one region.

18. Method according to claim 1, characterized in that the process chamber (22) used for the freeze-drying is connected by at least one transfer connection (53, 54) to another process chamber (21, 23, 221) having a filter (18, 218) at the top and intended for freeze-drying of the droplets or fluidization and drying of the particles (131), that the filter (18, 218) of each process chamber (21, 22, 23, 221) has at least one gas-permeable stocking or at least one gas-permeable cartridge and that the or each stocking or the or each cartridge of the filter (18) serving for the freeze-drying is longer than the or each stocking or the or each cartridge of the filter (18, 218) belonging to the or another process chamber (21, 23, 22).

\* \* \* \* \*